United States Patent [19]
Mossadegh et al.

[11] Patent Number: 5,900,036
[45] Date of Patent: May 4, 1999

[54] MULTI-CYLINDER APPARATUS FOR MAKING OPTICAL FIBERS, PROCESS AND PRODUCT

[75] Inventors: Reza Mossadegh, Alexander, Va.; Jasbinder Sanghera, Greenbelt, Md.; Ishwar Aggarwal, Fairfax Station, Va.

[73] Assignee: The United States of America as represented by the Secretary of the Navy, Washington, D.C.

[21] Appl. No.: 08/708,017

[22] Filed: Aug. 30, 1996

[51] Int. Cl.$^6$ .................................................. C03B 37/022
[52] U.S. Cl. .................. 65/384; 65/389; 65/412; 65/384; 65/401; 65/404; 65/405; 65/502
[58] Field of Search .............................. 65/412, 389, 377, 65/384, 401, 404, 405, 502

[56] References Cited

U.S. PATENT DOCUMENTS

| | | | |
|---|---|---|---|
| 2,992,517 | 7/1961 | Hicks | 65/401 |
| 4,133,664 | 1/1979 | Aulich | 65/405 |
| 4,193,782 | 3/1980 | Aulich | 65/405 |
| 4,243,296 | 1/1981 | Aulich | 65/405 |
| 4,259,100 | 3/1981 | Aulich | 65/502 |
| 4,897,100 | 1/1990 | Nice | 65/405 |

FOREIGN PATENT DOCUMENTS

| | | | |
|---|---|---|---|
| 5332042 | 3/1978 | Japan | 65/405 |
| 57-201203 | 12/1982 | Japan | 65/388 |

*Primary Examiner*—John Hoffmann
*Attorney, Agent, or Firm*—Thomas E. McDonnell; George Kap

[57] ABSTRACT

A vertically disposed apparatus used to make core-clad optical fibers includes an inner elongated cylinder removably closed at the top and provided at the bottom with an inner exit port of a smaller diameter than the inner cylinder and an outer cylinder, disposed around the inner cylinder, removably closed at the top and provided at the bottom with an outer exit port of a smaller diameter than the outer cylinder. The inner exit port is of a smaller diameter than the outer exit port and is disposed directly above the outer exit port. The apparatus also includes a heater for heating the inner and outer cylinders and acces to the inner and the outer cylinders for individually pressurizing inner and outer cylinders. The process by which the core-clad optical fibers are made includes the steps of placing a solid glass core rod into the inner cylinder of the apparatus described above, placing a solid glass cladding tube into the outer cylinder, melting the core rod and the cladding tube, quickly cooling the molten core rod and cladding tube to the drawing temperature, individually pressurizing the molten core rod and cladding tube, and drawing the core-clad optical fiber through the exit ports.

5 Claims, 2 Drawing Sheets

MULTI-CYLINDER APPARATUS FOR MAKING OPTICAL FIBERS, PROCESS AND PRODUCT

BACKGROUND OF INVENTION

1. Field of Invention

This invention pertains to the field of optical fibers.

2. Description of Prior Art

There are several conventional processes for making glass optical fibers, including, rod-in-tube, nozzle tube and double crucible processes.

In the rod-in-tube process, a glass core rod is placed into a glass cladding tube, heated to above the glass softening temperature, and drawn into an optical fiber. Typically, the core rods are obtained by quenching the core melt whereas the cladding tubes are obtained by spinning the cladding melt during cooling. However, several problems are associated with the rod-in-tube process that limit its usefulness. The problems include sublimation of the glass components at fiber draw temperatures and subsequent deposition on the rod and inner surface of the tube and presence of capillaries and imperfections at the coreclad interface. As a result, the fibers drawn by this process possess high optical loss due to scattering of light and are weak. Also, the fiber core/clad ratio is fixed and predetermined by the rod and tube diameters.

The nozzle tube process is a modification of the rod-in-tube process. In this process, the glass rod and tube are placed into a nozzle tube and drawn into a fiber. The core/clad interface is under vacuum and the outside of the cladding tube is pressurized so that the fiber can be drawn at a lower temperature. Lower temperature minimizes the sublimation of the glass components but does not completely remove it, since the vacuum enhances sublimation. Therefore, the fiber optical losses remain high and the fibers are relatively weak. Again, the fiber core/clad ratio is typically fixed and predetermined by the rod and tube diameters.

In the double crucible process, the core and cladding glass cullets or powders are charged into two concentrically disposed crucibles with an orifice in their bottom portion. The crucibles are placed into a resistance furnace and the glasses are melted and fined for several hours. Then, the temperature is dropped slowly to the fiberizing temperature and the melt is drawn into an optical fiber. There are several disadvantages in this process which can be attributed to the different processing steps. The disadvantages include contamination of the glass during the fracturing and grinding of the glass chunks, trapping of gas bubbles during melting, volatilization losses which change the composition of the glasses due to a long fining time and no control over the core/clad diameter ratio.

SUMMARY OF INVENTION

It is an object of this invention to make an optical glass fiber using inner and outer concentrically disposed cylinders.

It is another object of this invention to make an optical fiber from a solid glass core rod and a solid glass clad tube.

It is another object of this invention to make an optical fiber of a core and a cladding enveloping the core characterized by independent and individual control of diameter of core and/or cladding.

It is another object of this invention to make a strong optical fiber with low transmission loss measured over a length exceeding 10 meters.

These and other objects of this invention are attained by an apparatus and a process for making optical fibers which includes the steps of placing a core rod and a clad tube into inner and outer cylinders, respectively, assembling the cylinders so that the inner cylinder is disposed within the outer cylinder to form an assembly, heating the assembly to melt the rod and the tube, individually pressurizing the inner and outer cylinders, and drawing an optical fiber from the assembly. The resulting optical fiber is strong, due to fewer imperfections which can form points of weakness, and has lower transmission loss when measured over a length of the fiber exceeding 10 meters.

DESCRIPTION OF INVENTION

This invention relates to an apparatus, to a process for making an optical fiber using the apparatus, and to an optical fiber made by the process.

The apparatus is characterized by a pair of concentric cylinders provided at bottom thereof with ports of reduced diametric extent compared to diameters of the cylinders through which ports issue core and clad of the optical fiber. The apparatus is also characterized by control means to individually control the core and/or clad diameters. The process is characterized by the use of a solid glass core rod and clad tube which core rod and clad tube are melted before the optical fiber is drawn therefrom. The process also embodies a feature which permits individual control of core and/or clad diameters.

The optical fiber made as described herein is strong, is more uniform in composition compared to prior art optical fibers and can attain transmission loss of less than 0.1 dB/meter when measured on longer lengths of the fiber, typically 10 meters or longer.

Figure 1:
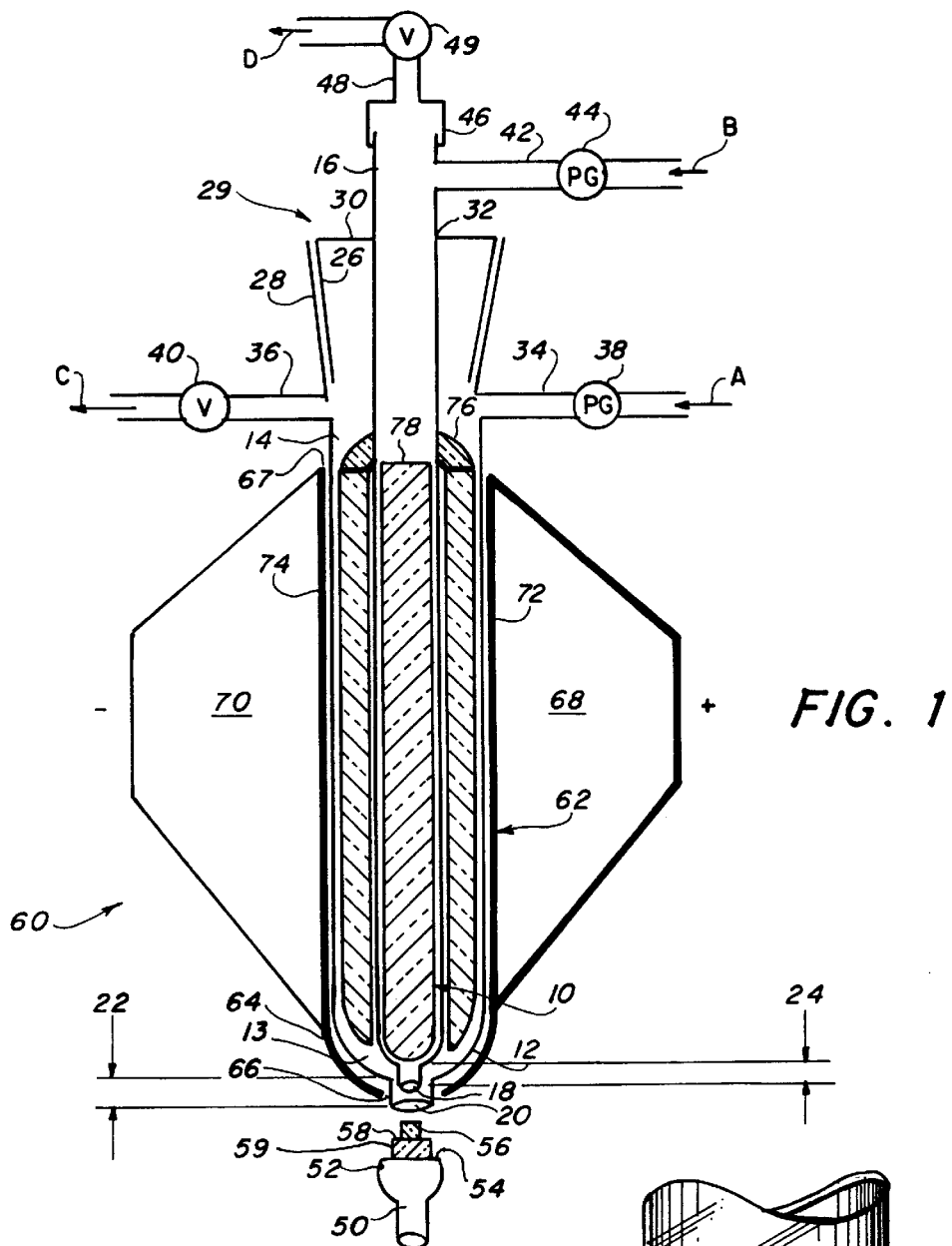
FIG. 1 is a schematic representation of the apparatus used to make the optical fiber of this invention which apparatus is characterized by a pair of concentric cylinders.
Figure 2:
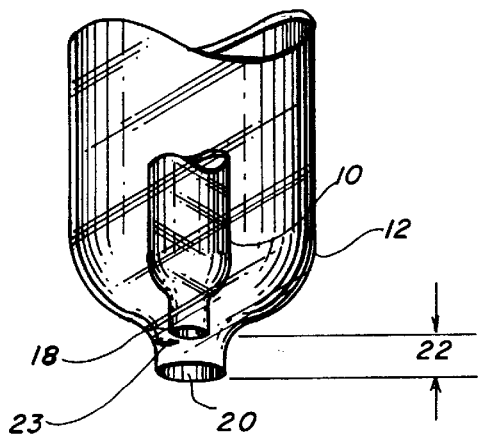
FIG. 2 is a longitudinal cross-sectional view of the inner and outer cylinders showing the horizontal gap between the inner port and the inner surface of the outer cylinder at a location where the surface of the outer cylinder is horizontal and meets the outer port.

The apparatus is shown in FIG. 1 and includes inner, elongated cylinder 10 concentrically positioned within an outer elongated cylinder 12 providing an elongated tubular chamber 14 between the inner and outer cylinders. As shown, the inner and outer cylinders are circular in radial cross-section. In a preferred embodiment, however, they can be of any shape desired. The inner cylinder 10 has an elongated chamber 16 within its structure.

Inner diameter of inner cylinder 10 is typically in the range of 1–100 mm, more typically 2–50 mm. Since outer cylinder 12 is larger than the inner cylinder 10, its respective diameter is larger. Inner diameter of outer cylinder 12 is typically in the range of 5–200 mm, more typically 10–100 mm. Wall thickness of the inner and outer cylinders 10, 12, respectively, is typically in the range of 0.1–10 mm, more typically 0.5–5 mm. Thickness of the cylinder walls should be sufficient to offer structural integrity when in use.

At bottom of inner and outer cylinders are inner port 18 and outer port 20. Inside diameter of inner port 18 is smaller than the inside diameter of inner cylinder 10 and is an extension of the inner cylinder 10 whereas inner diameter of outer port 20 is smaller than the outer cylinder 12 and is an extension thereof. Outside diameter of the inner port 18 is smaller than the inside diameter of the outer port 20. Port 18 is disposed directly above port 20. Each port 18, 20 has a longitudinal section 22, 24 through which core and clad of the optical fiber are drawn.

Inside diameter of the inner port opening 18 is typically 0.1–20 mm, more typically 0.5–10 mm, and its length is typically 0.1–10 mm, more typically 0.5–5 mm. Inside diameter of outer port opening 20 is typically 0.2–30 mm, more typically 0.5–20 mm, and its length is typically 0.1–10, more typically 0.5–5 mm.

Typically, termination of inner port 18 is on the same level as the horizontal part 13 of the outer cylinder. The gap 23 is the horizontal distance between port 18 and outer cylinder 12 and is typically 0.1–25 mm, more typically about 1–5 mm.

At the lower end of the two cylinders is plug 50 which has cylindrical structure 52 with cylindrical seat 54 disposed around structure 52. Plug 50 also has cylindrical structure 56 with cylindrical seat 58. Structure 56 is smaller in diameter than seat 58 and is disposed centrally on seat 58. Seat 58 is disposed centrally on structure 59 which is disposed centrally on seat 54. In assembled condition when plug 50 is engaged, structure 56 is disposed within and plugs inner port 18 with seat 58 disposed against the tip of port 18 and structure 59 is disposed within and plugs outer port 20 with seat 54 disposed against the tip of port 20. The plug can have other structures which close the ports.

The inner and outer cylinders 10, 12, respectively, are concentrically positioned with respect to each other by means of frusto-conical inner and outer sections 26, 28 which are disposed at the upper portions of the cylinders. Section 26 is closed at the top whereas section 28 is open at the top.

Section 26 is an inwardly inclined, frusto-conical surface of cap 29 which also includes upper horizontal and circular surface 30 with a central opening 32 therethrough at which point the inner cylinder is joined to section 30. In assembled condition shown in FIG. 1, function of cap 29 is to seal outer chamber 14 from atmosphere and to concentrically position inner cylinder 10 within outer cylinder 12. The outer surface of section 26 and inner surface of section 28 can be ground and these sections mate to concentrically position the cylinders relative to each other. Outer section 28 is integral with outer cylinder.

Located below outer section 28 of the outer cylinder 12 are conduits 34, 36. Conduit 34 is connected to a gas source and conduit 36 is connected to exhaust. A pressure gauge 38 is connected to conduit 34 to enable measurement of flow of pressurized gas therethrough and valve 40 is connected to conduit 36 to enable measurement of exit of gases from outer cylinder 12. Conduit 36 can also be connected to a vacuum, if it is desired to place chamber 14 under vacuum.

Conduit 42 is provided at the upper extremity of inner cylinder 10 extending above the hermetically sealed joint 32 which marks the connection between surface 30 and inner cylinder 10 in the assembled condition shown in FIG. 1. Conduit 42 is connected to a pressure gauge 44 which enables measurement of a pressurized gas source. Conduit 48 communicates with interior of inner cylinder 10. Conduit 48 is connected to valve 49 to enable measurement of exit of gases from inner cylinder 10. Conduit 48 can also be connected to a vacuum, if it is desired to place chamber 16 under vacuum. The upper end of inner cylinder 10 is sealed from the atmosphere by cap 46 which fits over top of the cylinder.

The assembly of FIG. 1 is disposed in metallic open-ended bushing heater 60 which includes a cylindrical nesting cylinder 62 having at the bottom thereof inwardly curving retention surface 64 with a circular opening 66 at the bottom thereof and opening 67 at its top. Bushing heater 60 has a pair of diametrically opposed arms or electrodes 68, 70 connected to a power source for imparting heat to the assembly disposed within the heater. Arms 68, 70 are disposed below side arms 34, 36. Arms 68, 70 are typically polygon-shaped and are connected to cylinder 62 along lines 72, 74 which lines extend from the top of cylinder 62 to the bottom thereof terminating just above retention surface 64 at about the point where inward curvature of the retention surface commences.

Of course, heating can be provided by any other means used for heating glasses for drawing into fibers. These other means include, but are not limited to, rf induction heating.

The assembly shown in FIG. 1, including the inner and outer cylinders, are typically made of quartz although it can be made of any other electrically conducting or non-conducting material that has the desired structural integrity and chemical stability.

The bushing heater is typically made of Inconel alloy, although any other electrically conductive material can be used, including carbon or a precious metal selected from gold, platinum and silver or an alloy. Inconel alloy, which is composed of 76% nickel, 15% chromium and 9% iron, is corrosion-resistant. Making the bushing heater of platinum, for instance, would allow the heater to impart higher temperature to the assembly since platinum has a high melting temperature which is above the melting temperature of the Inconel alloy.

The apparatus illustrated in FIG. 1 and described above, is used in connection with the process for producing an optical fiber consisting of a glass core and a glass cladding enveloping the core. The fiber outside diameter is typically 10–1000 microns, more typically 50–500 microns, where the core diameter is typically 1–90%, more typically 30–70% of the fiber outside diameter.

A chalcogonide glass and components thereof are inert to quartz. Quartz is typically used when making chalcogenide glass and other non-reactive glasses. In this case, the cylinders are made of quartz, as shown in FIG. 1. However, fluoride glass, and molten components thereof, for instance, reacts with quartz so that quartz is typically not used in apparatus which is used to make fluoride glass. What is typically used to make fluoride glass optical fibers is apparatus made of a precious metal or an alloy thereof, such as platinum. However, if the apparatus is made of a metal, the bushing heater can be dispensed with since the glass can be melted by way of the cylinder itself if the cylinder is made of a metal. Although it is possible to have only one cylinder of an electrically conducting material and the other of a non-conducting material, in which case heating is done only by the conducting cylinder, typically, both of the cylinders are of an electrically conducting material, in the instance where it is necessary or so desired.

The apparatus used to make optical fibers disclosed herein is typically provided with additional components to aid in the manufacture of optical fibers. Such components can include atmosphere conditioning chamber, fiber diameter measuring instrument, a resin coater, a uv irradiation chamber, a printing roller or a capstan, a take-up drum and a tensioner. Also, more than two cylinders can be used to form an optical fiber which has a secondary or multiple claddings.

The process for producing an optical glass fiber includes the steps of positioning a glass cladding tube 76 within chamber 14, formed between spaced inner and outer cylinders 10, 12, and a glass core rod 78 within chamber 16 of inner cylinder 10. Using solid cladding tube and core rod presents one with an opportunity to visually inspect same for presence of surface bubbles, surface irregularities and other surface imperfections and use only the tube and rod which meet the desired criteria.

Once the cladding tube is placed within the outer cylinder and the core rod is placed within the inner cylinder, the process is continued by positioning the inner cylinder within the outer cylinder to form the assembly shown in FIG. 1. The properly executed positioning step concentrically positions the loaded inner and outer cylinders so that port 18 is disposed directly above and spaced from port 20.

Following the step of concentrically positioning the inner loaded cylinder within the outer loaded cylinder, the assembly is placed within the bushing heater and side conduits 34, 42 are connected to a source of an inert gas, as shown in FIG. 1. When the assembly is placed within the bushing heater, the loaded outer cylinder is disposed within and supported by bushing cylinder 62. This is when plug 50 is inserted into the bottom extremity of the two concentric cylinders so that cylindrical structure 56 is disposed within and blocks inner port 18 and cylindrical structure 59 is disposed within and blocks outer port 20.

Valves 38, 40, 44 and 49 are opened and the inert gas under pressure entering through side conduits 34 and 42 in the direction indicated by arrows A and B enters chambers 14, 16, sweeps or purges gases therefrom and out through side conduits 36, 48. Purging of the chambers also establishes an inert atmosphere therein over the cladding tube and the core rod.

With the loaded assembly disposed within the bushing heater as shown in FIG. 1, arms 68, 70 connected to an electrical power source are energized by increasing the current thereto resulting in conductive heating of the core rod and the cladding tube to above liquidus temperature thereof in order to completely melt the rod and the tube. The liquidus temperature will depend on the material that the rod and the tube are made of.

The heating step can be carried out typically at a rate of 1–100° C./min, more typically 1–30° C. The heating of the tube and the rod to above melting temperature thereof so that the tube and rod are completely melted removes any surface imperfections that might have been on the surfaces of the tube and rod and eliminates any crystals that may have been present therein.

Fining and homogenizing of the melted tube and rod is accomplished by maintaining the molten glass at a constant temperature above $T_g$ for as long as it takes to remove imperfections, such as bubbles. This step typically takes 0.25–6 hours. Following fining and homogenizing, the molten glass is then quickly cooled to the fiber drawing temperature. The bushing heater allows this step to be carried out quickly by reducing power thereto so that cooling from above liquidus temperature down to the fiber drawing temperature takes place much quicker than the prior art, in a period of time typically 1–30 minutes, more typically 2–10 minutes. Quick cooling from above the liquidus to the fiber drawing temperature produces minimal crystal growth since crystal growth is enhanced by slow cooling. Quick cooling leads to minimal crystal growth and strong optical fibers with low optical transmission loss due to reduced light scattering.

After cooling the molten glass to the optical fiber draw temperature, plug 50 is removed which opens ports 18, 20 for the molten glass to flow out of chambers 14, 16. At ports 18, 20, viscosity of the glass should be in the range of $1\times10^314$ $1\times10^7$ poise at draw temperature for satisfactory fiber drawing to proceed.

Before drawing the fiber, valve 40 on exhaust conduit 36 and valve 49 on exhaust conduit 48 are shut-off to prevent flow of gas out through conduits 36, 48 in the direction indicated by arrows C, D. This is followed by closing exhaust valves 40, 50 and introducing an inert pressurized gas into the chambers, which gas pressure is monitored by means of pressure gauges 38, 44. The pressure in both chambers is independently controlled by means of pressure controllers and flow meters which permits independent control of the diameter of the fiber core and thickness of the fiber cladding. Since single mode optical fibers have core diameters generally less than 20 microns, the pressure in chambers 14, 16 is adjusted so that an optical fiber of desired relative core/clad diameter is obtained whether it is single or multi mode. For single mode fibers, the pressure in chamber 16 would be much less than in chamber 14. In order to obtain sufficient fiber draw rate in meters per minute, pressure in chambers 14, 16 is typically about 0.01–30 psi, more typically about 0.05–5 psi above atmospheric.

When the plug is initially removed, a bead forms of the glass issuing through the ports. This bead is removed and drawing of the optical fiber is commenced and continued to be wound on a take up roll.

The resulting optical fiber has a core of the material corresponding to that of the molten core rod and a cladding surrounding the core of a material corresponding to that of the molten cladding tube. This optical fiber is stronger than known fibers of similar compositions drawn by other techniques over long lengths. Since the solid rod and tube are melted and the surface imperfections on the rod and tube are eliminated during the melting operation, the drawn optical fiber acquires a pristine surface. Surface imperfections, if carried into the drawn fiber, would weaken it. The resulting fiber has lower transmission loss over a long length than known fibers because melting of the rod and tube melts any crystals and removes many imperfections. The resulting fiber is also of a more uniform composition. Therefore, the resulting fiber also has low transmission loss over longer lengths of the fiber. An allegation in prior art of a transmission or optical loss of 1 dB/m at certain wave length, for example, typically means a loss over a length of fiber of about 1 meter. The fiber herein is also more uniform and can attain low loss over longer lengths of fiber, such as about 10 meters or more.

The invention having been generally described, the following examples are given as particular embodiments of the invention to demonstrate the practice and advantages thereof. It is understood that the examples are given by way of illustration and are not intended to limit in any manner the specification or any claim that follows.

EXAMPLE 1

Figure 3:
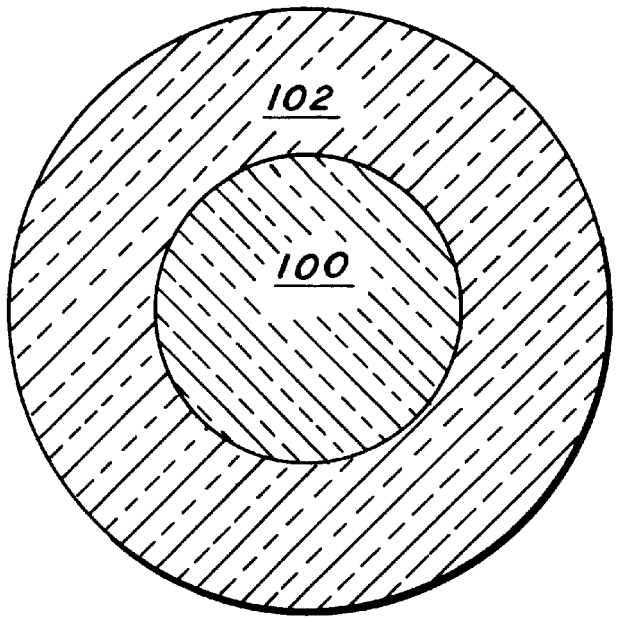
FIG. 3 is a radial cross sectional view of the optical fiber made pursuant to Ex. 1, herein, showing a core and a clad enveloping the core.

This example demonstrates the process for making an optical fiber, described herein, using the apparatus of FIG. 1. The cross-section of the resulting fiber is shown in FIG. 3.

Solid chalcogenide core rod 78 was made by melting in a quartz ampule for several hours a glass mixture of 40 atomic % arsenic, 58 atomic % sulfur and 2 atomic % selenium, designated as $As_{40}S_{58}Se_2$. The batch was melted at 750° C. The melt was quenched and annealed at about its $T_g$, which was 200° C. The rod was 6 mm in diameter and 12 cm long. Solid chalcogenide cladding tube 76 was fabricated by melting a glass mixture of 40 atomic % arsenic and 60 atomic % sulfur, designated as $As_{40}S_{60}$, in a quartz tube for several hours and spinning the quartz tube at 1600 rpm during cooling. The cladding tube was annealed from about 200° C. The cladding tube thus obtained had inside diameter of 11 mm, outside diameter of 15 mm, and was 9 cm long.

The core rod and the cladding tube were placed within inner and outer cylinders 10, 12, respectively i.e., in the inner and outer chambers 16, 14. Inner and outer cylinders 10, 12 were made of quartz. Wall thickness of the inner cylinder was 1 mm, its outside diameter was 10 mm, its inside diameter was 8 mm and its length was 280 mm, measured from port 18 to the top of cap 46. Inside diameter of outer cylinder 12 was 16 mm, its outside diameter was 20 mm, its wall thickness was 2 mm and its length was approximately 180 mm, measured from port 20 to the top of surface 28.

After loading the cylinders with rod and tube to form an assembly, the assembly was plugged with plug 50 so that its integral structures 56, 59 fit into and exit ports 18, 20. The plugged assembly was then placed within nesting cylinder 62 of bushing heater 60 made of Inconel.

Using the apparatus shown in FIG. 1 for drawing optical fiber also included the steps of connecting inlet conduits 34, 42 to a source of pressurized nitrogen gas, connecting exhaust conduits 36, 48 to exhaust and vacuum source, and purging chambers 14, 16 with nitrogen at a rate of about 50 cm³/min. Bushing heater then was heated to 525° C. at a rate of 10° C./min and held there for 15 minutes to allow the rod and the tube to melt completely. Temperature of the rod and tube glass melt was reduced to 500° C. and fined at 500° C. for 140 mintues to remove entrained gas bubbles. After fining, temperature of the melt was reduced from 500° C. to fiber draw temperature of 340° C. over a period of about 5 minutes by reducing electrical power to electrodes 68, 70. At this point, plug 50 was removed.

Valves 40, 50 were closed, pressure in chamber 16 was established at 0.50 psi above atmospheric and in chamber 14 at 0.20 psi above atmospheric and fiber drawing was initiated through ports 18, 20. Inside diameters of ports 18, 20 were 3 mm and 7 mm, respectively, their outside diameters were 5 mm and 11 mm, respectively, and their lengths 22, 24 were 2 mm each. Inner port 18 was 2 mm directly above outer port 20. Initial fiber drawing was characterized by glass bead formation which bead was removed and the fiber that continued to issue through port 20 was wound on a take-up roll.

About 25 meters of core-clad fiber was thus drawn at a rate of 1.5 meters per minute. The fiber had a core diameter of 145 microns and a cladding diameter of 190 microns. Cross-section of to this fiber is shown in FIG. 3 where core is designated 100 and cladding 102. The bend diameter to failure of the fiber was less than 1 cm, which indicates a strong and durable fiber.

EXAMPLE 2

This example demonstrates the capacity of independently varying pressure in the chambers where the rod and tube initially reside in order to obtain the desired core/clad diameter ratio in the optical fiber.

Figure 4:
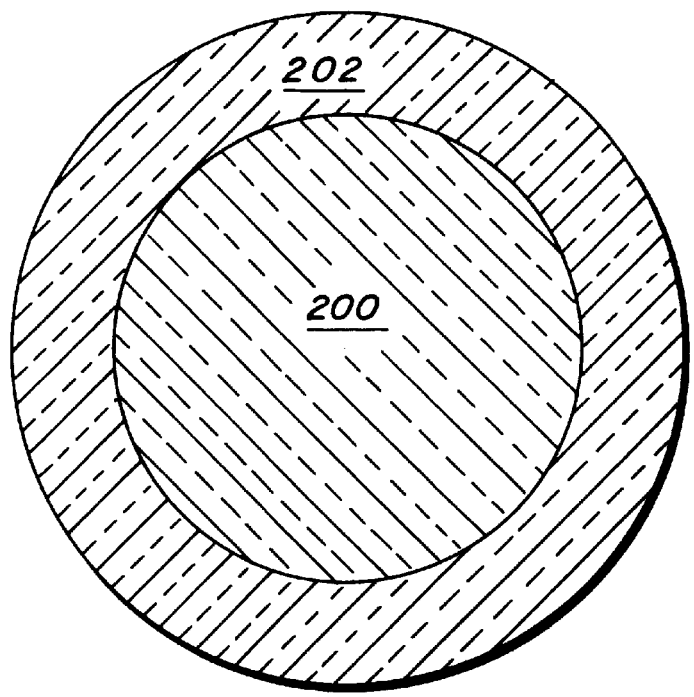
FIG. 4 is a radial cross-sectional view of the optical fiber made pursuant to Ex. 2, herein, showing the capacity to independently control the diameter of the core and/or clad and is on the same scale as FIG. 3.

Using the same apparatus and procedure of Ex. 1, with exception of core chamber pressure of 0.7 psi and cladding chamber pressure of 0.25 psi, about 20 meters of core-clad optical fiber was drawn at the same draw rate wherein the core diameter was 190 microns and outer diameter of the cladding was 240 microns. Cross-section of the optical fiber is shown in FIG. 4 where core is designated 200 and cladding 202

EXAMPLE 3

This example demonstrates preparation of optical fiber in the same manner as in Ex. 1 with following exceptions:

inner port inside diameter—2.8 mm outer port inside diameter—7.25 psi core chamber pressure—0.35 psi cladding chamber pressure—0.15 psi About 25 meters of the optical fiber was drawn at a rate of 2.5 m/min with a core diameter of 145 microns and cladding outer diameter of 290 microns.

EXAMPLE 4

This example demonstrates preparation of optical fiber in the same manner as in Ex. 3 with one difference:

core chamber pressure was 0.70 psi.

About 20 meters of the optical fiber was drawn with a core diameter of 180 microns and cladding outer diameter of 310 microns. Optical loss for this fiber was 0.64 dB/m at a wavelength of 5.0 microns, measured on greater than 10-meter fiber length.

EXAMPLE 5

This example demonstrates preparation of a single mode optical fiber using a revised procedure of Ex. 1 and an altered apparatus of FIG. 1.

As far as the revised procedure was concerned, the principal difference resided in heating the core rod and the cladding tube to 500° C. for 15 minutes and then reducing to the draw temperature of 345° C. in 5 minutes.

The altered apparatus was the same as that shown in FIG. 1 with the exception of the inner cylinder which was cylindrical with a frusto-conical section the end thereof terminating in the inner port 1 mm in inner diameter. The frusto-conical section covered the 2.5 cm of the lower end of the inner cylinder, including the inner port. The inner port was disposed 0.5 mm directly above the outer port.

With core chamber pressure of 1" $H_2O$, cladding chamber pressure at 0.5 psi, over 100 meters of the single mode fiber was drawn at 3 m/min wherein the core diameter was 14 microns and the cladding outside diameter was 130 microns.

Many modifications and variations of the present invention are possible in light of the above teachings. It is, therefore, to be understood, that within the scope of the appended claims, the invention may be practiced otherwise than as specifically described.

What we claim:

1. A process comprising the steps of:
   a. positioning a fully dense and solid glass core rod within an inner cylinder provided with an inner exit port at an end thereof;
   b. positioning a fully dense and solid glass cladding tube within an outer cylinder within which is disposed the inner cylinder, the outer cylinder being provided with an outer exit port at an end thereof wherein the outer exit port is positioned below the inner exit port;

c. melting the core rod and the cladding tube;

d. reducing the temperature of the molten core and the cladding to a drawing temperature;

e. individually pressurizing the molten core and the cladding; and f. drawing the optical fiber after the exit ports, with the core flowing through the inner exit port and the cladding flowing through the outer exit port.

2. The process of claim 1 wherein viscosity of the molten core and cladding is $1 \times 10^3 - 1 \times 10^7$ poise at the drawing temperature.

3. The process of claim 2 including the step of fining the molten core and cladding for a period of 0.25–6 hours.

4. The process of claim 3 wherein said step of melting the core and the cladding is carried out by heating same to a temperature above the respective liquidus temperatures at a rate of 1–100° C./min.

5. The process of claim 4 wherein said step of reducing temperature of the molten core and cladding to the drawing temperature takes 2–10 minutes after fining.

* * * * *